Figure 1:
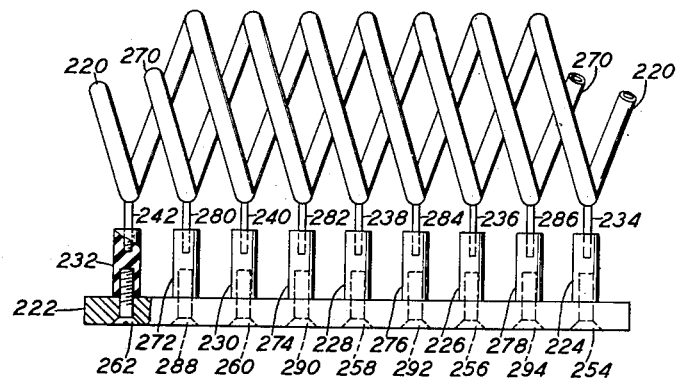

Feb. 4, 1941.    G. PETERSON    2,230,364
INDUCTANCE DEVICE
Original Filed May 7, 1936

INVENTOR
G. PETERSON
BY
W. J. O'Neill
ATTORNEY

Patented Feb. 4, 1941

2,230,364

UNITED STATES PATENT OFFICE 2,230,364

INDUCTANCE DEVICE

Glen Peterson, Pasadena, Calif., assignor to Bell Telephone Laboratories, Incorporated, New York, N. Y., a corporation of New York Original application May 7, 1936, Serial No. 78,365. Divided and this application July 26, 1939, Serial No. 286,515

11 Claims. (Cl. 175—359)

This invention relates to radio apparatus and particularly to inductance devices suitable for use as circuit elements in radio frequency systems such as oscillator systems, for example.

This application is a division of my copending application for Reactance devices, Serial No. 78,365, filed May 7, 1936, now U. S. Patent 2,185,-355, dated January 2, 1940.

One of the objects of this invention is to stabilize the electrical impedance characteristics of inductance devices.

Temperature variations, mechanical vibrations, and other changes influence the frequency stability of radio apparatus. Temperature changes may cause expansion and contraction of the several parts of the apparatus and corresponding changes in the inductance and capacity thereof with resulting frequency variations. Vibrations may shake the parts, likewise changing the inductance and capacity of the system and of the component parts thereof.

To control the effects of vibration upon the frequency stability, the several parts may be so intimately fastened together as to cause the assembly to respond as a single unit. To provide for attenuation of vibration where the vibration comes from a source exterior to the apparatus itself, a vibration attenuating mounting medium such as one or more sponge rubber mats may be interposed between the source of vibration and the apparatus to prevent conduction of and to damp out vibrations.

To control the effect of temperature change upon the frequency stability of the system, the inductance devices in circuit therewith may each be constructed in such manner that the apparatus returns to its original dimensions at a given temperature after being heated or cooled and, therefore, has a constant electrical impedance characteristic at a given value of temperature. For this purpose, the apparatus may have component insulating and metallic parts composed of such materials and so disposed or interconnected with reference to temperature coefficients of expansion of the parts as to permit free expansion and contraction thereof in all directions without producing stresses therein or slippage therebetween. Such construction contemplates that the expansion along any one axis be the same as that along any other equal length axis parallel thereto, that members connected by transverse parallel members shall have the same over-all temperature coefficients of expansion measured axially between their ends, that before and after a temperature change all angles between the parts remain the same and that each part that is homogeneous maintains its volume symmetry. With such construction substantially no stresses in or slippage between the component parts are introduced when the temperature changes.

Figure 2:
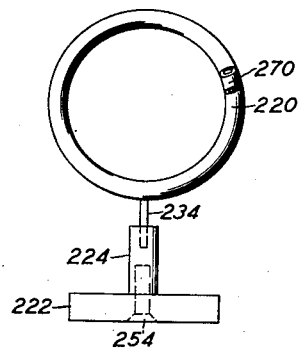

For a clearer understanding of the nature of this invention and the additional features and objects thereof, reference is made to the following description taken in connection with the accompanying drawing, in which like reference characters indicate like or similar parts and in which:

Figs. 1 and 2 are side and end views, respectively, of an inductance device embodying this invention.

Referring to the drawing, Figs. 1 and 2 illustrate an inductance device having stable inductance characteristics. An inductance element comprising a solenoidal coil 220 constructed of copper conductor such as quarter inch diameter hollow copper tubing of suitable dimensions and a suitable number of equal diameter turns is supported from a flat plate 222 of the same material, namely copper, by a suitable number of equal length insulating pillars 224, 226, 228, 230 and 232 of hard rubber or preferably quartz or "Isolantite" or other suitable dielectric, preferably relatively free of cold flow and aging qualities. Small prongs 234, 236, 238, 240 and 242 of copper or other suitable material and of equal length may be suitably fastened as by screw threads, for example, to the insulating pillars 224, 226, 228, 230 and 232, respectively. The extreme bottom portions of the turns of the copper tubing 220 are suitably fastened as by soldering, for example, to the vertical prongs 234, 236, 238, 240 and 242. The insulating pillars 224, 226, 228, 230 and 232 are fastened to the copper plate 222 by suitable means such as copper screws 254, 256, 258, 260 and 262, respectively.

While the coil 220 and the plate 222 are preferably wholly constructed of copper of the same temperature coefficient of expansion, it will be understood that other suitable material such as aluminum may be utilized to provide the same over-all expansion as measured between ends connected by any two of the transverse parallel members 224, 226, 228, 230 and 232.

The coil 220 so constructed and mounted is free to expand and contract in every direction. The length and also the diameter of the coil 220 is wholly determined by copper. The spacing between the coil 220 and the plate 222 is wholly determined by the supporting members therebetween, each having the same over-all temperature coefficient of expansion. Accordingly, all of the parts are so connected with respect to each other that when the temperature changes, no stresses are introduced into the component parts, no frictional slippage is introduced between the component parts, all angles between all of the component parts remain the same before and after a temperature change, each part that is homogeneous maintains its volume symmetry, and any two members connected by transverse parallel members have the same over-all temperature coefficients of expansion as measured between their ends whereby the expansion along any one axis is the same as that along any other equal length axis parallel thereto.

Another copper coil 270, similar to the coil 220, may, if desired, be inductively coupled with the coil 220 by disposing the turns of the coil 270 in spaced relation between those of the coil 220 and supporting the turns of coil 270 from the copper plate 222 by equal length insulating pillars 272, 274, 276 and 278, by screws 280, 282, 284 and 286, and by screws 288, 290, 292 and 294 in the same manner as the coil 220 is supported.

Although this invention has been described and illustrated in relation to specific arrangements, it is to be understood that it is capable of application in other organizations and is, therefore, not to be limited to the particular embodiments disclosed, but only by the scope of the appended claims and the state of the prior art.

What is claimed is:

1. An inductance device including an inductance coil, at least some of the turns of said coil having substantially coaligned surfaces, a supporting plate having a surface disposed substantially parallel to said coaligned surfaces, and substantiallly equal length and parallel insulating pillars disposed between and secured to said coaligned surfaces and said surface of said supporting plate, said coil and said supporting plate being composed of the same metallic material having substantially the same temperature coefficient of expansion, and said insulating pillars having substantially equal over-all temperature coefficients of expansion along said equal length dimensions thereof.

2. An inductance device including an inductance coil, a support, said coil and said support being of substantially the same metallic composition having substantially the same temperature coefficient of expansion, and means including a plurality of insulating members securely connected to said coil and said support and having substantially equal over-all temperature coefficients of expansion as measured between the points of connection to said coil and support.

3. An inductance device including an inductance coil, a support, said coil and said support being composed of the same metallic material having substantially the same temperature coefficient of expansion, and means including a plurality of insulating members each individually connected to substantially one point only of said coil and said support and all having substantially equal over-all temperature coefficients of expansion as measured between the points of connection to said coil and support.

4. An inductance device including an inductance coil having self-supporting inductance turns, a support, said coil and said support being composed of metallic material having substantially the same temperature coefficient of expansion, and means including a plurality of insulating members each connected to substantially one point only of said coil and said support and all having substantially equal over-all temperature coefficients of expansion as measured between the points of connection to said coil and support, said members being axially substantially parallel with respect to each other.

5. An inductance device including an inductance coil, a support, said coil and said support being composed of metallic material having substantially the same temperature coefficient of expansion, and means including a plurality of insulating members connected to said coil and said support, and having substantially equal over-all temperature coefficients of expansion as measured between the points of connection to said coil and support, said members being axially substantially parallel with respect to each other and substantially perpendicular with respect to the surfaces of said coil and support to which they are connected.

6. An inductance device including an inductance coil having self-supporting inductance turns, a support, said coil and said support being composed of metallic material having substantially the same temperature coefficient of expansion, and means including a plurality of insulating members each securely connected to substantially one point only of said turns of said coil and said support and all having substantially equal over-all temperature coefficients of expansion as measured between the points of connection to said coil and support, all of said members being axially substantially parallel with respect to each other and disposed in substantially the same plane.

7. An inductance device including an inductance coil, a support, said coil and said support being composed of metallic material having substantially the same temperature coefficient of expansion, and means including a plurality of insulating members connected to said coil and said support and having substantially equal over-all temperature coefficients of expansion as measured between the points of connection to said coil and support, said members being axially substantially parallel with respect to each other, axially substantially perpendicular with respect to the surfaces of said coil and support to which they are connected, and axially disposed in substantially the same plane.

8. An inductance device including an inductance coil, a support, said coil and said support being composed of metallic copper having substantially the same temperature coefficient of expansion, and means including a plurality of insulating members securely connected to said coil and to said support and having substantially equal over-all temperature coefficients of expansion as measured between the points of connection to said coil and support, said members being axially substantially parallel with respect to each other, substantially perpendicular with respect to the surfaces of said coil and support to which they are connected, and disposed in substantially the same plane.

9. An inductance device including an inductance coil member having self-supporting inductance turns composed of metallic material, a support member composed of metallic material, and a plurality of transverse insulating members securely connected to and disposed between said coil and said support members for mounting said coil member from said support member, said metallic coil member and said metallic support member having substantially the same temperature coefficient of expansion, and said insulating members having substantially the same over-all temperature coefficient of expansion measured linearly between their points of connection to said coil member and said support member.

10. An inductance device including an inductance coil, a support, and a plurality of transverse insulating members each securely connected to said support and to substantially one point only of said coil and disposed between said coil and said support for mounting said coil from said support, said coil and support being composed of metallic material having substantially the same temperature coefficient of expansion.

11. An inductance device including an inductance coil element having self-supporting inductance turns, at least a part of said turns having substantially coaligned surfaces, supporting means having a surface disposed substantially parallel to said coaligned surfaces of said element, said means and said element being composed of metallic material having substantially the same temperature coefficient of expansion, and a plurality of substantially parallel insulating members each disposed between and secured to one point only of said coaligned surfaces and to said surface of said supporting means, said members being of substantially equal length and having substantially equal over-all temperature coefficients of expansion along said equal lengths thereof as measured axially between the points of connection to said supporting means and said coaligned surfaces, said length dimension of said members being substantially perpendicular to the center line axis of said coil turns.

GLEN PETERSON.